Dec. 16, 1969     H. J. HARRIS     3,484,046
SPRINKLING APPARATUS
Filed Jan. 3, 1969     4 Sheets-Sheet 1
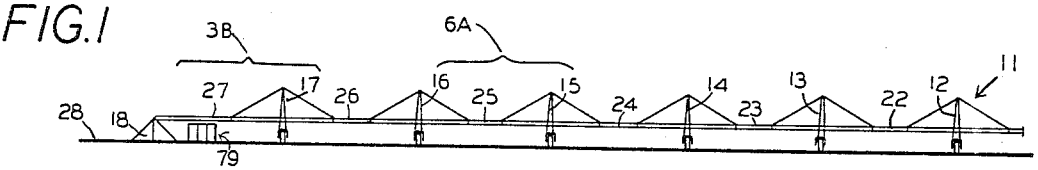
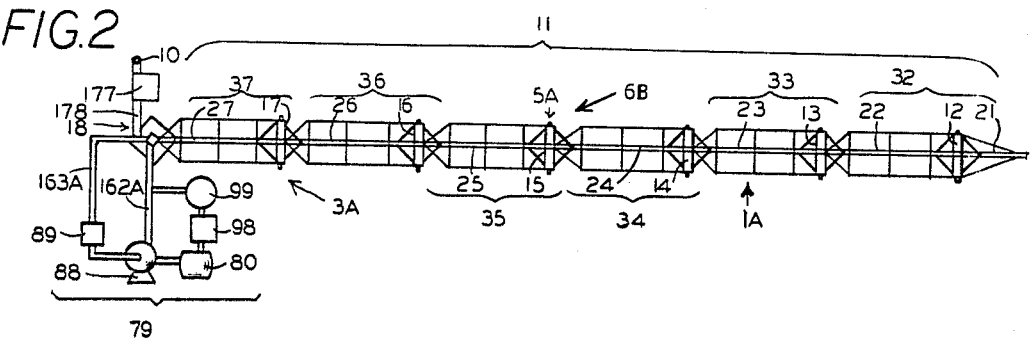
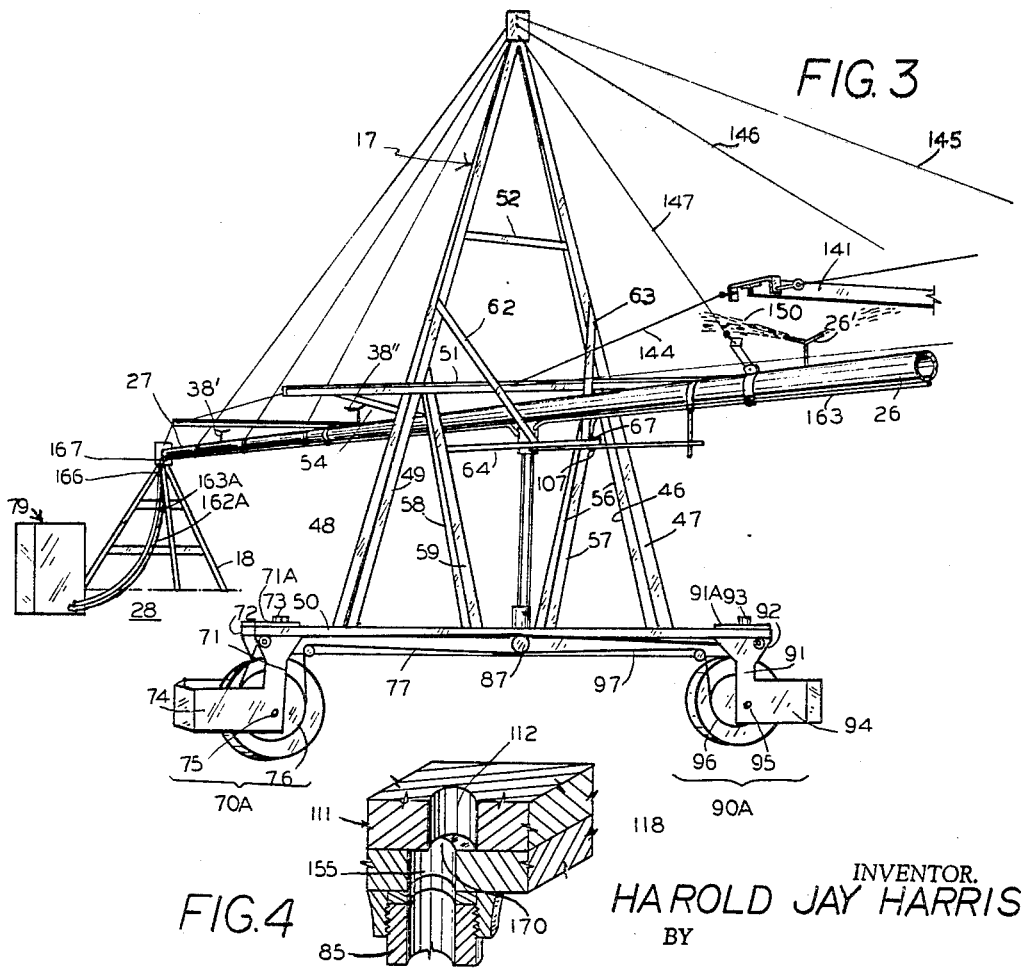
INVENTOR.
HAROLD JAY HARRIS
BY
Ely Silverman
ATTORNEY Dec. 16, 1969  H. J. HARRIS  3,484,046
SPRINKLING APPARATUS
Filed Jan. 3, 1969  4 Sheets-Sheet 2
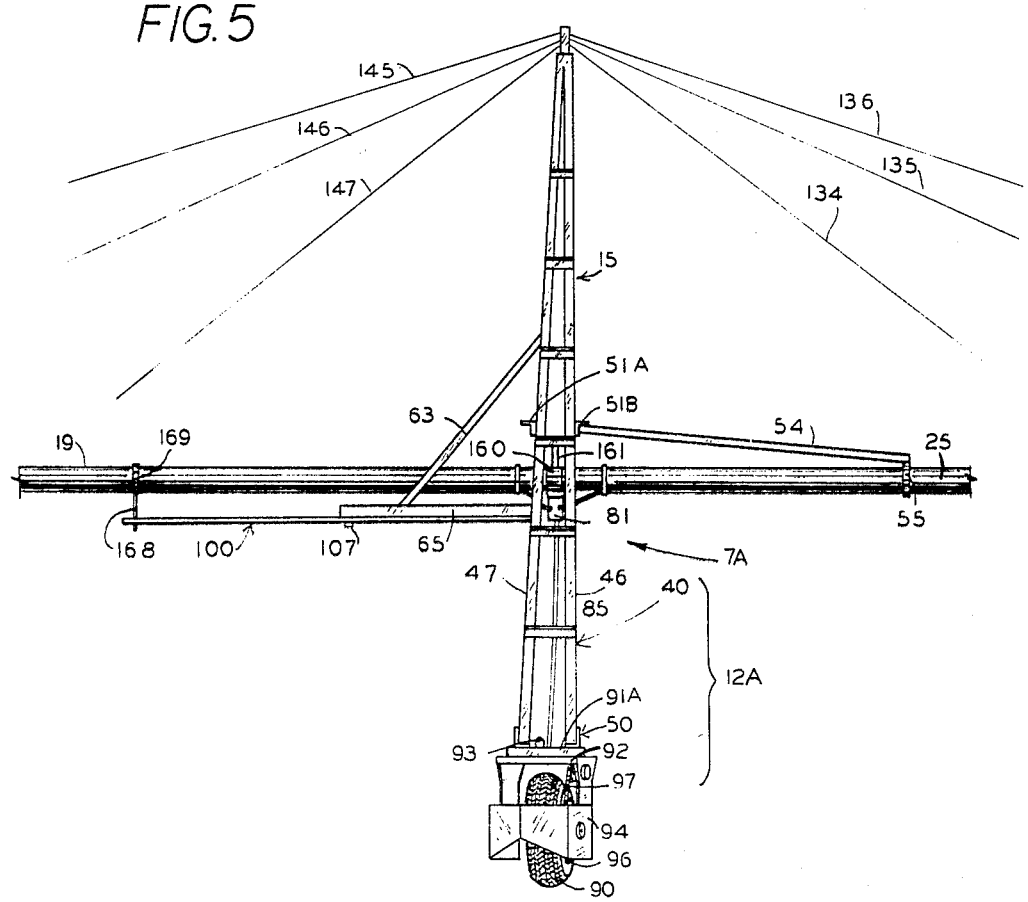
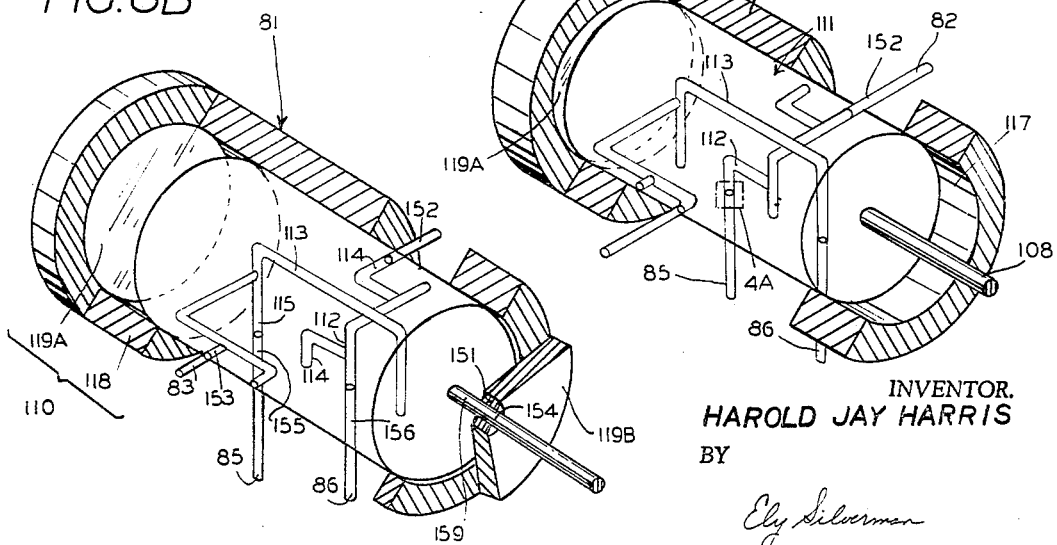
INVENTOR.
HAROLD JAY HARRIS
BY
Ely Silverman
ATTORNEY Dec. 16, 1969  H. J. HARRIS  3,484,046
SPRINKLING APPARATUS
Filed Jan. 3, 1969  4 Sheets-Sheet 3
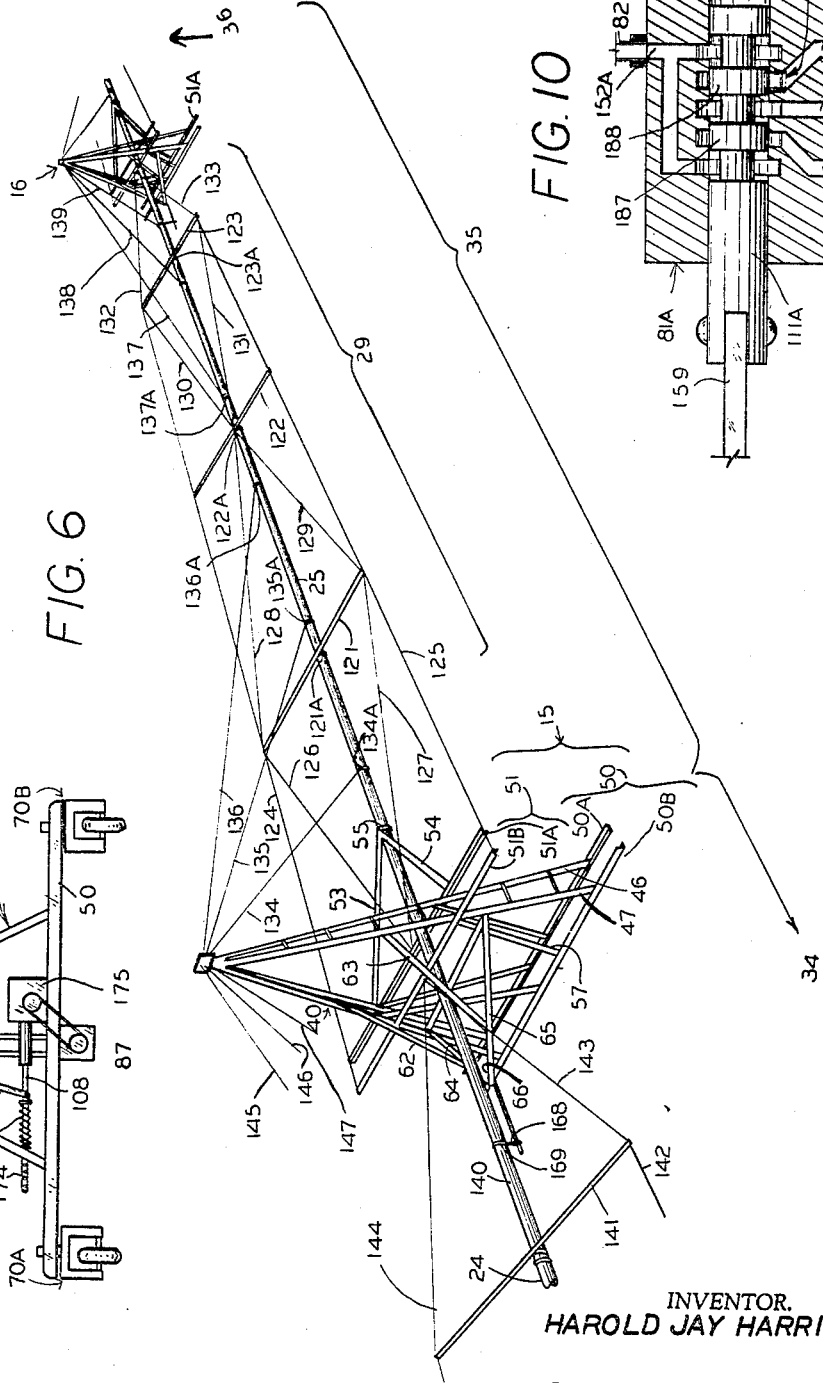
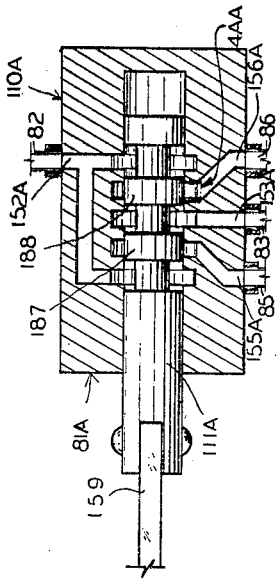
INVENTOR.
HAROLD JAY HARRIS
BY:
*Ely Silverman*
ATTORNEY Dec. 16, 1969   H. J. HARRIS   3,484,046
SPRINKLING APPARATUS
Filed Jan. 3, 1969   4 Sheets-Sheet 4

INVENTOR.
HAROLD JAY HARRIS
BY
*Ely Silverman*
ATTORNEY

United States Patent Office
3,484,046
Patented Dec. 16, 1969

3,484,046
SPRINKLING APPARATUS
Harold Jay Harris, Levelland, Tex., assignor to Gifford-Hill-Western, Inc., Lubbock, Tex., a corporation
Filed Jan. 3, 1969, Ser. No. 787,311
Int. Cl. B05b 15/00
U.S. Cl. 239—177                                    4 Claims

ABSTRACT OF THE DISCLOSURE

A combination of irrigation sprinkler supporting pipe sections and movable pipe supporting towers rigidly united with traction sensitive motors on each tower station, the units of movable towers and the pipe therebetween powered to move continuously and evenly in a preset formation in a circular pattern and thereby distribute irrigation water in an even and predictable manner.

BACKGROUND OF THE INVENTION

The field of the invention is that of a process of fluid spraying and sprinkling utilizing an apparatus comprising a series of joined lengths of fluid conduits having appropriate spray outlet means and vehicular support means secured thereto, the whole being such to conform to the contour of the terrain while in spraying position.

Description of the prior art: Prior moving sprinkler apparatuses applied equal power for varied lengths of interrupted periods of time to effect control of motion of each of several pipe supporting stations at the limit of substantial allowed variation of relative position of those stations. A sprinkling apparatus which depends upon movement of movable wheeled pipe supports controlled by bending or springing of the pipe between the support stations require the development of lags between pairs of stations prior to actuation of the lagging station and prior to stopping of the station in an advanced position. Especially where water motors operate in an intermittent manner, as on ratchets, with continuous water discharge from a distributor pipe, stoppage or slowing of motion of an intermediate station while lateral stations adjacent thereto advance, followed by stoppage of the lateral stations while the center station advances to a position sufficiently advanced to actuate the lateral stations, results in a distribution of water no more uniform than a checker board as time for development of curvature over a long length of the pipe is required to actuate such stepwise motion.

By the apparatus of this invention and its process of operation the amount of water distributed at any period of time to any unit of land area then being traversed thereby is uniform from one like period of time to the next.

SUMMARY OF THE INVENTION

Combination of distributing pipe, movable pipe supporting towers, and a drive system for the towers, constructed with a throttle unit that permits continuous application of differing amounts of power to each of several wheeled pipe supporting tower vehicles traversing concentric circular paths and providing that traction met by the wheels of each of the vehicle towers control its speed; the pipe between towers is guyed to connect towers so as to require more traction on wheels of towers in advance of pre-selected relative position therefor and less traction for a station to the rear of pre-selected position therefor, a pre-set formation of the traveling vehicles is maintained; additional means located at a point spaced away from neighboring towers and responsive to relative position of the pipe and station at that point instantaneously corrects for undesired position of the towers operating at desired different speeds as needed.

Water is passed to the circularly moving pipe and there are spray or sprinkler means thereon which form an even distribution of the water to the land from the pipe allowing for the unequal speeds of different portions thereof. Even transfer of the water to the land is provided by the continuous and uniform rate of movement of that pipe.

BRIEF DESCRIPTION OF THE DRAWINGS

FIGURE 1 is a rear view of one embodiment of apparatus 11 showing representative portions thereof as seen along direction of arrow 1A of FIGURE 2.

FIGURE 2 is a top plan view taken of the apparatus 11 portions shown in FIGURE 1.

FIGURE 3 is a perspective view of portion 3B of FIGURE 1 taken along the direction of the arrow A3 of FIGURE 2.

FIGURE 4 is a perspective view of a detail in the zone 4A in FIGURE 8A.

FIGURE 5 is a front end view of a typical movable tower station, 15, as seen along the direction of the arrow 5A of FIGURE 2.

FIGURE 6 is a perspective view of the arrangement of cable and other structures between and in association with two adjacent tower stations as 14 and 15 in the zone 6A of FIGURE 1 as seen from above obliquely, in direction of arrow 6B of FIGURE 2.

FIGURE 8A is a perspective and phantom broken away view through the valve 81 in a normal forward operating position thereof; FIGURE 8B is a similar perspective and phantom broken away view in the position of parts thereof arranged for reverse flow.

FIGURE 9 is a side view of the portion of the station 12 corresponding to zone 12A of FIGURE 5.

FIGURE 10 shows diagrammatically in longitudinal cross-section another valve, 81A, with a spool in casing arrangement that may be used in lieu of the valve 81.

Figure 7:
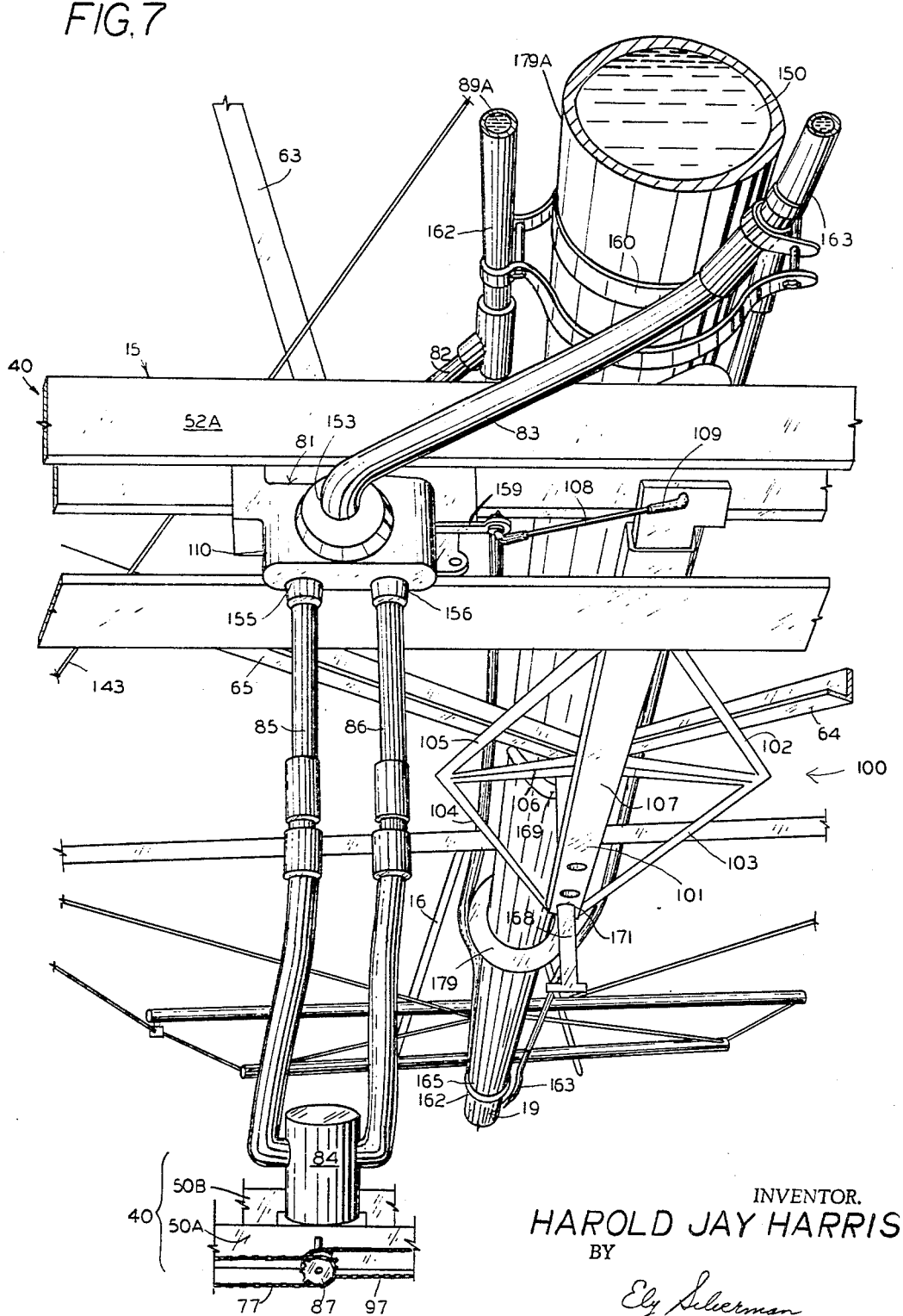
FIGURE 7 is an oblique and perspective view as seen from below and obliquely along the direction of arrow 7A of FIGURE 5.

The term "radial" as used herein refers to the rightward direction along pipe series 19 in FIGURE 1 away from the fixed central station 18; and the term "central" refers to the leftward direction along pipe series 19 in FIGURE 2, towards the fixed central station 18. The term "forward" refers to the direction of motion of apparatus 11 counterclockwise as seen from above and as shown in FIGURE 2 and "rearward" is the opposite direction.

DESCRIPTION OF THE PREFERRED EMBODIMENT

The apparatus 11 generally comprises a combination of a hydraulic power source 88 and conduits, irrigation sprinkler supporting pipe 19 and movable pipe supporting towers as 12 through 17 rigidly united with portions of pipe 19, and traction sensitive tower station motors on each station so arranged that the movable towers and the pipe therebetween move continuously and evenly and thereby distribute irrigation water in an even and predictable manner.

More particularly, the apparatus 11 comprises a series of like units of guyed pipes and vehicle tower stations as 33, 34, 35, 36 and 37, a generally like unit 32, a fixed station 18, and a hydraulic power developing and transmission assembly 79. Apparatus 11 operates on a water supply source 10.

Each unit as 35 comprises a vehicle tower station, as 15 and a portion, as 25, of a string of pipe 19 firmly fixed thereto and located centrally (as below described) thereof. Pipe string 19 comprises a pipe portion 21 which is located on the radial side of the most radial vehicle tower station 12; a like pipe portion 22 is located on the radial side of vehicle tower station 13 between tower stations 13 and 12; a like pipe portion 23 is located radially of station 14 and located between stations 13 and 14; correspondingly like portions of pipes 24, 25, 26 and 27 are located centrally of like vehicle stations 14, 15, 16 and 17 respectively and are operatively attached thereto and supported thereon as below described.

The units 33–37 are identical, however station 12 of unit 32 is rigidly attached at its radial side to a guyed portion 21 of pipe 19, which portion 21 is continuous with portion 22 thereof.

Irrigating nozzles as 38' and 38" are located on pipe portion 27 and like nozzles 21', 22', 23', 24', 25' and 26' are located on the like pipe portions 21 through 26 respectively to effect distribution to all portions of the field 28 of water passed into the central portion of the pipe 19 via a central vertical pipe 20 at station 18 and operatively attached to water source 10. Portions 20–27 are continuous. Each of such nozzles or sprinkling heads as 38' is located at suitably spaced distances along each of the pipe portions as 21–27, and is provided with a shut-off valve. The sprinkling heads may be of any suitable type, such as provided with a nozzle for discharging a jet of water against a flat blade which spreads the stream and causes a greater area behind the pipe to be watered by each head. The sprinkling heads are preferably spaced apart in accordance with the width of the stream of water discharged from each head, with a slight overlap for complete field coverage, the nozzles preferably varying in the amount of water discharged, proportional to the distance from the center. That is, nozzles farther from the center discharge a greater amount of water, or be spaced closer together, because of the greater territory to be covered at a longer radius.

The pipe 19 is preferably of a sufficient diameter, such as six inches, to provide a reservoir of water which therefore may be at a low pressure, such as 25 pounds per square inch, so that the pressure at each of the heads 38· will be substantially the same. The heads 38 preferably do not discharge large volumes of water, but merely enough to approximate a light to medium rainfall, so that as the pipe 19 is rotated slowly and evenly around the field 28, the water will have an opportunity to soak into the ground without forming pools from which an undue amount of water may tend to evaporate. Thus, to adequately water the field it may be necessary for the apparatus 11 to operate 1 to 3 days, to transverse a field of one quarter section size completely.

Various alternative means may be provided for delivering the desired liquid from the pipe 19 to the land over which it passes, including a series of perforations formed in and extending throughout the length of the pipe. Those perforations near the central end of pipe portion 27 are preferably somewhat smaller than those near the free end portion 21 of the pipe series 19 so as to obtain an even distribution of the liquid over the field 28.

Each movable vehicle station as 15 comprises a rigid A-shaped frame assembly 40 and a wheel assembly 41.

Each frame as 40 comprises a rigid central front member 46, a rigid lateral front member 47, a rigid central rear vertical member 48 and a rigid radial rear vertical member 49. Members 46 and 47 extend forwardly and downwardly; members 48 and 49 extend rearwardly and downwardly as in FIGURES 3 and 6. The vertical members 46–49 are connected at their bottom to a rigid horizontal wheel support member 50; the center portion of the members 46, 47, 48 and 49 are firmly fixed to support a rigid horizontal guide support member 51. Rigid truss elements 56, 57, 58 and 59 are attached to elements 46, 47, 48 and 49 respectively at their top and bottom and provide rigidity to each frame element 50 as shown in FIGURE 3. These are all two inch steel L's in a particular embodiment of the invention and provide for a rigid support to the tower structure as 14. A horizontal rigid member 52 is attached to the members 46–49 below member 51. Member 51 is firmly fixed to and supports the portion of pipe 19 therebelow; rigid transverse element 52 extends from elements 56 to 58 and from 57 to 59 and supports the valve unit 81 of the tower.

A rigid rear pipe support truss element 54 extends centrally and forwardly from the frame 40 as shown in FIGURES 3 and 6; a corresponding front element 53 is attached to the element 48 and 46 and extends centrally and rearwardly. The elements 53 and 54 are joined at their central edge and they are there firmly joined to a band 55; the band 55 firmly holds the adjacent portion pipe 19 (25 in FIGURES 5 and 6); a clamp 160 is firmly located on the portion of pipe 19 between elements 46–49 and below guide support 51. A hanger 161 extends across and is firmly attached to elements 51 and clamp 160 is supported thereby.

An adjustment arm support assembly 61 comprises a series of rigid diagonal elongated elements 62, 63, 64, and 65; 62 being a top rear adjustment arm support element, 64 a bottom rear control arm support element, 65 a bottom front adjustment arm support element and 63 the bottom front control arm support element. Elements 64 and 65 are joined at their radial ends, to a pivot bearing plate 66, elements 62 and 63 are attached at their respective upper ends to elements 45 and 47 as shown in FIGURES 3 and 6 and at their bottoms, elements 62 and 63 are attached to and firmly support and locate the elements 64 and 65 respectively at rear and front of pipe 19. Elements 64 and 65 are firmly attached at their central (right as shown in FIGURE 6) ends to the elements 59 and 57 respectively. The rigid bearing plate 66 is firmly attached to and located by elements 64 and 65. The top of an adjustment arm pivot support rod 107 is pivotally supported in a bearing with a vertical axis in the plate 66; rod 107 supports assembly 100.

The wheel assembly 41 comprises a front wheel assembly 70A and a rear wheel assembly 90A. Assembly 70A is pivotally attached to front of member 50 and assembly 90A is pivotally attached to rear of member 50 on plates 71A and 91A.

The front wheel assembly 70A comprises a rear wheel 70, a rear wheel fork 71, a rear wheel fork base 72, a rear wheel fork base bolt 73, a rear wheel shield 74, a rear wheel axle 75, a rear wheel sprocket 76 and a rear wheel sprocket chain 77. The rear wheel 70 is located on axle 75 which is turn is rotatably located at bottom of fork 71. The top of the fork 71 has a base 72 which is rotatably located on plate member 71A by vertical rear wheel bolt 73, fixed to base 72. A rear wheel shield 74 is firmly located on the fork 71 and serves to part the crops through which the movable tower station (as 15) moves. A rear wheel sprocket 76 is co-axially located on the axle 75 with the wheel 70 and is firmly fixed to the wheel 70. A rear wheel sprocket chain 77 joins the rear wheel sprocket 76 to drive it.

The rear wheel assembly 90A comprises a front wheel 90, a front wheel fork 91, a front wheel fork base 92, front wheel fork base bolt 93, a front wheel shield 94, a front wheel axle 95, a front wheel sprocket 96 and a front sprocket chain 97. The front wheel 90 is located on axle 95 which in turn is rotatably located at bottom of fork 91. The top of the fork 91 has a base 92, which is rotatably located on plate member 91A by a vertical wheel bolt 93 fixed to base 92. A front wheel shield 94 is firmly located on the fork 91 and serves to part the crops through which the movable tower station 14 moves. A front wheel sprocket 96 is co-axially located on the axle 95 with the wheel 90 and is firmly fixed to the wheel 90. A front wheel sprocket chain 97 joins the rear wheel sprocket 96 to drive it.

The hydraulic assembly 779 comprises a prime mover internal combustion motor 80, pump 88, a main hydraulic input line 162 and main hydraulic return line 163, and valves as 81 and hydraulic vehicle station motors as 84 on each station, and a control assembly 42, all operatively connected.

The pump 88 is directly connected to main hydraulic input line 162A which is firmly attached to line 19 as by clamps, as 164 and 165; line 162A extends from outlet of pump 88 to a rotatable distributor valve 166 on station 18 to line 162, line 162 extends from valve 166 to the last of the stations in the series (as 12 in FIGURES 1 and 2). A main hydraulic return line 163 is connected to the branch return line 83 of each station and extends along the length of pipe 19 from the most radial station of the system 11 (as 12 in FIGURES 1 and 2) to a rotatable return valve 167 on stttion 18; line 163A extends therefrom to sump 89. Clamps as 164 and 165 on pipe portions as 21–21 hold line 163 to pipe 19. Sump 89 feeds hydraulic fluid to the input of pump 88. Motor 84 is controlled by throttle 98, which throttle is controlled by automatic pressure sensor 99 connected to line 162A to keep a predetermined pressure in lines 162A and 162, in excess of 200 p.s.i., pressure in 163 is less than 10 p.s.i.

The control assembly for each intermediate tower station (between the end station 12 and the central pivot station 18) as 13–17, and referring to stations 13 and 15 as exemplary, comprises, on a movable tower station as 15, a control valve 81 with a hydraulic motor 84 and lines 82, 83, 85 and 86. A branch valve input line 82 is operatively connected to the input opening of valve 81 and provides for transmission thereinto of hydraulic fluid from line 162 and branch valve return line 83 is connected to the outlet orifice, 153, of valve 81 and connects to main hydraulic return line 163 and provides for hydraulic fluid return to line 163 from the valve 81. The hydraulic motor 84 is operatively connected by a motor input line 85 to one outlet opening 155 of valve 81, and a motor return line 86 connects from the rotor to another outlet opening 156 of the valve 81.

The motor 84 drives a double sprocket wheel 87. One set of teeth on the double sprocket wheel 87 is operatively connected to the front wheel chain 97 and another to the rear wheel chain 77 for movement thereof as determined by the position of the parts in valve 81. The motor input line 85 is herein referred to as a forward motor input line because, in a forward motion, line 85 is the input line (having a higher pressure therein) while motor return line 86, is, on such forward motion of the station 15, the return line; however, on motion that would be referred to as rearward motion the line 85 then becomes the motor return line and at that time the line 86 is the rearward motor input when the motion is reversed; forward motion is referred to herein unless otherwise stated.

The above description of the vehicle tower station 15 is applicable to all of the intermediate vehicular tower stations as 13–17 of apparatus 11 as they all (as shown for 15 and 17) have the same structure in general and in particular, except for the station next to the end, i.e. No. 12, are all identical in structure. Station 12 does not have elements such as 62–66 as are shown and provided on station 15.

The valve adjustment assembly 42 comprises the adjustment arm unit 100 and the valve unit 81. The control arm 100 comprises as seen from below and shown in FIGURE 7 a horizontally elongated rigid beam 101, diagonal brace rods 102, 103, 104, 105, and a transverse brace 106 and adjustment control arm 108. The transverse brace 106 is a horizontal rigid rod firmly fixed to beam 101 at about its middle. It is a rigid steel rod such as used for concrete reinforcing (about ¼ inch thick). The brace rod 102 is fixed at one end to the central end of the beam 101 and at the rear end of brace rod 102, it is, as shown in FIGURE 7, firmly fixed to an outer end of the brace 106. Similarly, rod 103 is attached to rear end of brace 106 and the radial end of the rod 101, and rods 104 and 105 are similarly firmly located on the other side of the beam 101 so that the entire unit 100 is quite rigid. Adjustment arm pivot support rod 107 is a rigid cylindrical rod firmly fixed to the beam 101 and pivotally located in a bearing in a plate 66 at junction of elements 64 and 65 for rotation about a vertical axis. Assembly 100 is thereby pivotally supported at radial end of assembly 61.

In each unit as 35 the portion, as 25, of the string of pipe 19 is provided with a guying assembly, as 29, for pipe portion 25 for rigid connection thereof, so far as bending about a vertical axis is concerned, to the vehicle tower station, as 15, of that unit.

The pipe guying assembly 29 comprises, for each section of pipe such as 25 between stations 16 and 15 (as shown in FIGURE 6) a plurality of like equal sized rigid braces 121, 122 and 123, cables as 124–139, and elements 53, 54 and 55 and 51. Each of braces 121, 122 and 123 extends forwardly and rearwardly of pipe portion 25 and is generally parallel to guide support 51 and each is firmly attached to the pipe portion 25 by a clamp therefor, 121A, 122A and 123A respectively. The adjacent portion of the string of pipe 19 is firmly held to each frame as 40 by a first clamp 160 firmly attached to elements 51A and 51B and a second clamp 55 that is firmly attached to the rigid pipe position support elements 53 and 54 at their junction to one side (as shown in FIGURES 5 and 6) of each station frame. The distance between each station as 15 and nearest brace, as 121, is the same as the distance between braces 121 and 122 and the same as the distance between braces 122 and 123 and between brace 123 and station 16, and the same as the distance between station 15 and brace 141 on pipe portion 24.

Strong yet flexible front and rear longitudinal taut wire cables 124 and 125 respectively run horizontally along and are attached to front and rear ends of members 51, 121, 122 and 123 respectively; the taut cables 124 and 125 thus maintain the elements 51, 121, 122 and 123 in parallelism. Additionally, taut rear diagonal cables 126, 128, 130 and 132 are connected in series, from a firm attachment at the center of guide 51 on station 15 to an attachment at the outer rear portion of brace 121 and thence to a firm attachment at the clamp 122A at the central portion of brace 122 and there firmly attached to the brace clamp 122A and thence to a firm attachment to the rear edge of brace 123, and wire 132 being connected to the center portion of guide support on the centrally neighboring element 51 on station 16.

Additionally, and cooperating therewith, taut wire cable elements 127, 129, 131 and 133 extend on the front of the pipe portion 25 from the center of element 51 on station 15 to the outer front edge of brace 121 where it is firmly attached and thence to the brace clamp 122A. Element 131 is also firmly attached to base 122A and to the front outer edge of brace 123 and to the center of guide support elements of station 16.

Additionally, vertically and centrally sideways extending taut tower wire cables 134, 135 and 136 are firmly attached to the top of tower 15 and extend centrally to clamps as 134A, 135A and 136A, respectively, which clamps are firmly attached on to the portion 25 of the pipe 19. Similarly taut wire cables 137, 138 and 139 are similarly attached to the top of tower 14 and extend radially and are similarly attached to the pipe portion 25 as by clamp 137A for cable 137 at the same spacing as is provided for by elements 134, 135 and 136 respectively.

In the preferred embodiment it will be noted that cable 136 does not extend centrally as far toward tower station 16 as the brace clamp 122A and that the wire 137 does not extend radially as far toward tower station 15 as the distance therefrom of brace clamp 122A and that the clamps 134A and 135A and 136A are substantially equally spaced along the pipe portion 25. This relationship of the vertical tower cables, i.e. that they do not overlap the center of the portion 25 of the pipe string 19 therebetween, is the same in all pipe portions of this apparatus between movable vehicle power station as 12 through 17. This arrangement provides that as one tower as 16 moves upward or downward relative to another tower as 15 one portion of the pipe 19 between the attachment of cables 136 and 137 to the pipe portion such as portion 25 of a unit as 35 may flex and permit vertical movement of the towers as 14 and 15 without any forward or rearward flexing of the pipe portion 25 from the attachment thereof to the frame of station 15 by the clamp 160 to the clamp 123A.

Similar to the structures of unit 35, in unit 34, tower cables 145, 146 and 147 which correspond to the cables 137, 138 and 139 on tower 16 extend radially (leftward as shown in FIGURE 6 toward the radial neighboring tower station (14 as shown in FIGURES 1 and 2). Similarly, in unit 34 the pipe portion 24, between stations 15 and 14, has a transverse brace 141 corresponding to brace 123 on pipe portion 25 of unit 35, and a front longitudinal cable 142 (corresponding to cable 125 for unit 35) and a cable 143 corresponding to a cable 133 in unit 35 between stations 15 and 16, and a cable 144, corresponding to cable 132 in the portion of assembly 29 of unit 35 between towers 15 and 16.

A clamp as 169, is firmly located on each pipe portion as 24 halfway between the vehicle station of the near central unit as 35 and the most radial brace as 141 of the unit 34. A rigid control tongue 168 is firmly fixed to the bottom of that clamp 169 and extends downward through and past hole 171 in the radial end of arm 101 of assembly 100 of unit 35 and forms a smooth fit therewith. The cables as 143 and 144 extend radially beyond the tongue 168 relative to the centrally adjacent station as 15 and the tongue 168 is located about one half of the distance between the centrally adjacent tower 15 and the brace 141 of the adjacent, radially located guying assembly for the portion as 24 of the pipe 19.

Each valve as 81 comprises a rigid fluid tight casing 110 enclosing a valve chamber 117. The casing 110 has side walls as 118 and front end wall 119A and rear end wall 119B; the walls 118, 119A and 119B enclose a cylindrical chamber 117. Casing 110 has side openings 152 and 153, end opening 154 and bottom openings 155 and 156. Side opening 152 is an inlet line opening for the valve input line 82 from main hydraulic line 162 and chamber 117 is there operatively connected to input line 82. Side opening 153 is the outlet opening of valve 81 to valve output line 83 and chamber 117 is operatively connected therethrough to branch return or outlet line 83; casing end wall 119B has a central longitudinal shaft opening 154 with a fluid tight seal 151; a rigid connecting arm 159 is slidably located in hole in seal 151 and serves to locate the valve body along the length of chamber 117. Casing 110 also has two longitudinally spaced apart equal sized cylindrical openings 155 and 156; opening 155 is operatively connected to motor forward input line 85 and opening 156 is operatively connected to motor forward return line 86. These openings are located in a line parallel to axis of chamber 117 and are circular.

A valve body or spool 111 is located in chamber 117 and is operatively connected to the connecting arm 159, it is firmly and operatively attached to the adjustable arm end 109. Adjustment end 109 is operatively attached to the adjustment control arm 108. Control arm 108 is firmly attached to the central or valve end (top as shown in FIGURE 7) of beam 101. The valve body or spool 111 has a firmly slidable and fluid tight fit within walls of the chamber 117. As shown in FIGURES 8A and 8B spool 111 is provided with a narrowly branched input passage 112 and a widely branched exhaust passage 113; passage 112 passes through the body 111 from opening 152 to 155 of casing 110 (in position shown in FIGURE 8A) and to motor line 85 and a widely branched passage 113 passes from the opening 153 in casing 110 for return line 83 to the opening 156 for and to motor line 86.

Additionally, connected to passage 112, input reverse branch passages 114 and 114' extend from opening 152 in the position of parts shown in FIGURE 8B to opening 156 and a return reverse branch passageway 115 extends from opening 153 and hydraulic conduit 83 to opening 155 and conduit 85 in the position of parts shown in FIGURE 8B. Passages 112–115 in section are uniform and vertical adjacent openings 155 and 156.

In a particular embodiment of this invention there are some important dimensional relations in regard to the standard valve 81 as a power throttling means rather than as a reversing means.

The holes 153 and 156 are one-half inch national pipe thread female; such have 0.622 inch internal diameter. The cross sectional area of such pipe opening is 0.250 inch. A travel of body 111 of 0.622 inch from full open to full close of passage 155 and 156 is permitted. The inlet hole 152 is ¾ inch NPTF, with an inside diameter of 0.824 inch; the maximum useful longitudinal travel of body 11 is thus determined by the diameter of holes 155 and 156.

As shown in FIGURE 4 there is a definite and controllable constriction at the junction as 170 of the opening of each valve body passage as 112 and the corresponding valve casing orifice passage, as 155. Such orifice also exists where passage 113 meets passage 156. Such orifice effect, i.e. the pressure drop across the orifice between passage 112 in valve body 111 and the orifice 155 in valve casing 110 as well as the corresponding change in orifice size between passage 156 and 113, provide, on flow of hydraulic fluid 68 through line 82, valve 81 and line 83 for varied pressure drop as well as varied flow and varied power delivery to a motor as 84 of station 15 according to the position of body 111 in casing 110. The sizes of such orifices are readily controlled, when beam 101 is fixed, by adjustment of end 109 as well as by movement of beam 101.

As is conventional with hydraulic motors, the power output thereof is substantially constant and the power controls, as above described, readily and closely achieved.

On operation of the assembly 79 of apparatus 11, the motor 80 drives the pump 88, the pump drives hydraulic fluid via line 162A to line 162; hydraulic fluid 89A under pressure passes along line 162 and from branch valve input line 82 to a valve as 81 and thence, through orifices as 170 to motor 84, returning via another orifice as 170, thence to branch valve input line 83 thence to main hydraulic return line 163 and line 163A to sump 89. The pressure in main hydraulic input line 162 is substantially the same throughout its length and the difference in pressure between valve input line 82 and valve return line 83 at the valve as 81 at any station as 15 is substantially the same at any station in the system.

The valve body 111 is adjusted by nut 109 on arm 108 of valve 81 to be located in casing 110 so that the valve body relation to the valve casing 110 and valve casing to frame of the station in which it is located is generally shown in FIGURES 3 and 9; the center of bottom opening of channel 112 in the valve body 111 is in advance or forward of the position of the center of the top opening of the hole 155 in the bottom of valve body 110 but an open channel does exist between the channel as 112 and hole therefore, as 155. The center of the opening on top of passages 155 and 156 are spaced apart the same distance as the opening on bottom of passages 112 and 113 in the valve body 111 and are the same size and shape, i.e., circular. Accordingly, each such orifice or opening as 170 between the valve channels 112 and 155 is located so as to be reduced in size when the valve body 111 is moved forward and increased in size when the valve body 111 is moved rearwardly (with the terms "rearwardly" and "forwardly" being as shown in FIGURES 3 and 9, rear being to the left as shown in FIGURES 3 and 9 and forwardly to the right as shown in FIGURES 3 and 9). The movement of the valve body 111 and channels 112 and 113 therein relative to the casing 110 and the openings as 155 and 156 therein is adjusted by adjustment of the nut 109 which lengthens the arm 108 and so moves the valve body 111 forwardly (the valve end of beam 101 then being fixed) in the casing 110. Forwardly and rearwardly are shown in FIGURES 7, 8A and 8B in the reverse direction to that in which forward and reverse are shown in FIGURES 3 and 9.

The distance between orifices 155 and 156 is larger than the diameter of any openings of channels as 112, 113, 114 or 115 to orifices 155 and 165 (to avoid bypassing of liquid).

The most peripheral station 12, if apparatus 11 is not provided with an assembly 100 or 61 as present at typical intermediate station 15. However, arm 108 is connected to an arm 172 which is located by spring member 173 (toward valve body 81 on station 12) and tensile member 174 (to frame of station 12). Power input to station 12 from assembly 79 of apparatus 11 may also be adjusted by a speed control 175 to provide constant speed to station 12 and unit 32. A standard constant speed control 175 is supported on frame of station 12 and driven by sprocket wheel 87 and is operatively connected to arm 172 and thereby maintains the linear speed of station 12 at such value as is desired, usually 3 m.p.h. It is within the scope of the invention that station 12 may operate at such programmed speed as is desired around the 360° of the circular path it follows around stationary station 18.

Because the portion as 25 of pipe 19 is rigidly held to tower 15 by the guy wire system 29 above described, the pipe portion 25 moves parallel to the line of travel of wheels on that station or tower.

Accordingly a station, as 15, moving forwardly less rapidly, as measured in angular travel, about the station 18 than its neighbors, as 14 and 16, will have less traction on its wheels because its radially neighboring radial station, as 14, will be urging it by the rigid connection thereof to guyed portion 24 (which is structurally and functionally the same as 25 above described), prior to any change in angle between the portion of pipe 24 rigidly fixed to station 14 and flexibly attached to station 15 and the portion of pipe 25 between station 15 and station 16 that is rigidly fixed to station 15. With such assistance the force or torque required to move the station 15 forwardly is lessened and the speed of the hydraulic motor 84 increases until there is no additional urging force thereon. Additionally, when the station 15 and unit 35 moves at a greater angular speed than station 14 and unit 34 station 15 wheels require a greater torque and the speed thereof is reduced, as the power input is fixed. Station 15 does not stop when in advance of a lagging centrally neighboring station, as 16, but does move less rapidly than station 16 until the torque is so reduced in wheels of station 15 that the preset degree of traction on and redial speed of station 15 is attained.

When station 15 moves more rapidly than station 16, station 15 and its rigidly held guyed pipe portion 25 increases the torque for turning of wheels of station 15 and slows station 15 down prior to any change in angular relation between pipe portions 25 and 26. Also apparatus 11 permits adjustment of the orifice size at 155 and 156 in each valve as 81; thereby the pressure drop across each motor, as 84 (and the relative pressure drops across each of the motors at each of the stations) in the system 11 is set so that the motors will have different amounts of power, hence uniformly travel at the same angular speed, although at a different lineal speed, for continued periods and substantially independently of the amount of water distributed to field 28 through pipe 19 and with the same pressure differential across hydraulic lines 162 and 163 all along pipe 19. Inasmuch as the pressure drop is substantially the same from line 162 to 163 at any one station of the system the setting of the valve 81 provides for power input variation between stations while utilizing the same power source, i.e. the pressure across lines 162 and 163 is the same and the differences in pressure drops and volume flow at each station provide for differing power inputs at each station. Proportional to the distance of that pipe supporting tower or station from the axis of rotation of pipe 19 (at pipe 20) by adjustment of nut 109 on arm 108 for each station.

The pressure drop-off which is applied to the system by beam 101 provides for additional throttling action via valve 81 causing a greater pressure drop than is effected by the initial calibrated position. The positioning means of beam 101 is thus supplemental to the hydraulic system action that provides that the traction obtained at each station controls the motor speed.

The construction of apparatus 11 provides that there is no bending of string of pipe 19 from the attachment thereof at clamp 55 of station 15 and brace clamp 121A; similarly there is no bending of pipe 19 between clamp 160 of station 15 and the most distant transverse brace attached thereto by wires, as 123. Such bending of pipe 19 as is permitted in a unit as 34 is that which occurs between one clamp as 160 on one station as 15 and the adjacent transverse brace as 141, such bending is measured at a point (clamp 169) spatially removed from the station 15 and 14 frames. This arrangement permits continued unequal movement of one peripheral or radial station, as 14, relative to another, more centrally located station, as 15 (radial and central as shown in FIGURES 1 and 2), station 15 moving lineally, three times as far in any unit of time as does station 17. Thus movement of tongue 168 on a unit, 34, relative to central, distant, station 15 is not changed due to unequal linear travel or movement of any two stations as 14 relative to station 15, and does not start or stop the unit as occurs on units that are sensitive to unequal linear movement; the movement of central beam 101 effects the size of the orifice 170, as shown in FIGURES 8A and 9 hence the pressure drop and volume of hydraulic flow and hydraulic power throuh valve 81 to a motor at any one station and so provides for a continuous flow of power even when that statin departs from the desired unequal movement programmed for such station as 15 by the adjustment of arm 108 of valve body 111 relative to beam 101 at nut 109.

The structure 29 and firm clamp of portion of pipe 19 by clamps 55 and 150 on each tower station as 15 provides that there is no bending of the pipe at the attachment of each station to the portion of pipe 19 and such bending as occurs is at the zone of pipe portion as 140 between the wheels of one central station as 15 and the most central of the guide braces (as 143) rigidly connected to the tower station (as 14) radial to that first station (15) as shown in FIGURE 6; hence the corrective action of the beam 101 occurs rapidly before any substantial distortion of the pipe portion 140 although after correction of speed due to the automatic speed correction effected by the hydraulic motor 84 in response to change of traction of the wheels of that station and without any distortion of the pipe portion 140.

A feature of this invention is that there is no bending of the pipe at each support. Bending at any one support would require that there be bending of the pipe at both sides of the support and would require discrimination by sensing means at the support of the reason for such bending in order to make proper correction therefor. By avoiding any bending of the pipe at an intermediate station support as 15 difficulties in a sensing and control system are avoided. By this apparatus arrangement there is no bending of the pipe at any intermediate support, all the bending is at a point between supports, and assembly 100 for each vehicle motor station is the slave to only one master, the unit that is radial thereof, and is substantially insensitive to any bending that might occur at a unit, as 36, central thereof.

In operation a water supply source 10, as a well is provided with a pump 177, and a conduit system 178 operatively connected thereto and to central vertical pipe portion 20 at station 18. The vertical pipe portion is operatively connected to a water-tight swivel joint with a vertical axis of rotation; the pipe portion 21 of the string of pipe 19 is operatively attached to that joint and all portions as 21–27 of the string of pipe 19 are operatively connected in series, as at flanges as 179 at end of each length of pipe forming the series 19. Water is pumped through pipe 19 at a uniform and continuous rate: as below described all portions of the pipe 19, supported on the moving vehicular stations as 12–17 move at a uniform angular rate of movement in a circular path about station 18 and distributes the water 150 at a uniform weight per unit area on the field 28 traversed by the apparatus 11.

The wheel assemblies 70A and 90A of each station may be turned to a position whereat the axles thereof are perpendicular to the length of pipe string 19, as shown in FIGURE 10, rather than parallel thereto as shown in FIGURES 1, 3 and 5. After disconnection of chains 77 and 97 the wheel forks 71 and 91 pivot about the bolts 73 and 93 respectively. Apparatus 11 may be disconnected from water source 10 and/or its distribution system 178 and, inclusive of station 18 and assembly 79 (which are put on trailers), may then be drawn by a tractor attached to one end of series of pipe 19 in a direction parallel to the length of the series of pipe 19 to another location, and there connected to another water source or point of distribution of system 178 and operation from such other location as above described as its hydraulic power assembly 79 does not use the water distributed through the pipe 19 to field 28. Apparatus 11 may be used with water containing sand, silt and other suspended matter and without great pressure demands on the water distribution system.

In the particular embodiment shown the valve 81 is a Dukes Series DV–120 valve 4-way closed center type (Dukes Hydraulics, 3999 N. 25th Ave., Schiller Park, Ill. 60176, Bulletin DV–120, Mar. 1, 1967, p. 2006) and is used as a throttling valve primarily rather than as a reversing valve. However, for adjustment purposes it can be used as a reversing valve.

The vertical extension of tongue 168 through the hole 68 in each beam as 101 permits each station as 15 to move up and down vertically relative to station 14 without effecting the front to rear motion of the stations as 15 and 14. The overall length of pipe series 19 is about 1,320 ft., the various separate sections of pieces of 30 and 50 foot lengths of pipe are joined at conventional flanges as 179. Each of the towers or stations as 12–17 is each 90 feet from its neighboring station. The pipe 19 is high enough to pass over assembly 79.

Forks as 91 and 71 of assembly 41 of each station as 15 being pivotal about pins 93 and 73 are so fixed in position on frame 40 as to traverse a circular path about the center of station 18; thus fork 71 has the plane of rotation of the wheel 70 thereof slightly angled relative to the front-to-rear central axis of frame 40 (as shown in FIGURE 5) so that the motion of the wheels as 70 and 90 will be effected without skidding thereof and accordingly each such station or tower will traverse a circular path about the vertical line passing through the center of station 18 and the most central portion of the pipe series 19.

Frame 40 is, as shown in FIGURES 3, 5 and 6, a double frame of rigid steel L's with member 50 composed of two parallel like elements 50A and 50B with member 50A shown and described as joined to members 47, 49, 57 and 59 and member 50B shown joined to members 46, 48, 56 and 58 and several steel L's running between members 50A and 50B along the front to back length thereof; there is a pivot plate 71A between the rear end members 50A and 50B and a front pivot 91B between the front end of members 50A and 50B with the pivot bolts 73 and 93 passing through said plates 71A and 71B respectively and with bolts as 72A and 72B fixing the location of the assembly as 70A and 70B relative to the length of the elements 50A and 50B so that a non-skidding circular path will be traversed by the wheels 70A and 70B.

Each of the movable tower stations as 12–17 of the apparatus 11 has its wheels arranged relative to the frame 40 so that those wheels will traverse concentric circular paths about the vertical pipe 20 at the center of station 18.

Member 51 is also formed of two like and parallel members, 51A and 51B, with member 51A shown as attachment to members 47, 49, 57 and 59 and member 51B joined to members 46, 48, 56 and 58 and several steel L's running between and attached to members 51A and 51B along the front to back length thereof. Clamp 160 is firmly supported in element 51 by such transverse member 51C.

FIGURE 10 shows a valve 81A comprising a standard spool or valve body 111A in the casing 110A; the casing is provided with an inlet line opening or port 152A and outlet opening or ports 153A connected to lines 82 and 83 respectively. The valve body or casing 110A also has ports or openings 155A and 156A for connection to lines 85 and 86 respectively.

The spool body is provided with annular rings 187 and 188 that selectively block off openings as 155A, 156A, 182A and 183A to effect the same control as above described for valve 81, namely all ports are blocked and isolated when the spool is centered as shown in FIGURE 10; the orifice and constriction action at zone 4AA in FIGURE 10 corresponds to that above described for zone 4A of FIGURE 8.

In the preferred embodiment the pump 88 provides an output of 40 horsepower ±10% for each four stations as 14, 15, 16 and 17 and operates at 1800 r.p.m. and provides five gallons per minute of hydraulic fluid to each station of assembly 11. Pump 88 has a maximum output capacity of 2500 p.s.i. although it operates usually at about 500 p.s.i. output.

Each station motor as 84 operates, on a maximum full flow therethrough, with the valve orifices entirely open at 500 r.p.m. and with a flow therethrough of six gallons per minute and accepts pressures of between 2500 p.s.i. and 200 p.s.i. (differential between the input 85 and the output 86). With a pressure therethrough of 500 p.s.i. and flow of 6.4 gallons per minute, each motor delivers 2.3 brake horsepower. The overall height of each tower as 15 from the ground to the top is 17 ft. 8 inches. FIGURES 3 and 5 are drawn substantially to scale as to the station there shown and other dimensions may be calculated therefrom. The overall height of each frame as 40 is 15 ft. 2 inches from the bottom of element 58 to the top of the tower.

Each of the neighboring towers as 13 and 14 and 15 and 16 in the assembly 11 are 90 ft. apart from one to the other (center to center). The attachments of the cables as 134, 135 and 136 to the pipe string 19 as at points 134A, 135A and 136A are 12½, 25, and 37½ feet respectively from the attachment of that pipe string of the clamp, as 160, at the adjacent stations.

The pipe 19 is composed of 45 ft. joints of pipe as 179A joined by flanges as 179. Each tower as 15 is located in the middle of the 45 foot long joint or length of pipe. Accordingly, the pipe between the towers as 17 and 16 (broken at FIGURE 1) is composed of a left-hand element 22½ ft. long and a right-hand element 45 ft. long. The attachments at 134A and 137A of the cables as 134 and 137 (shown in FIGURE 6) leaves a 15 ft. span in the middle thereof for vertical movement up and down of the pipe string between the towers as 15 and 16 without effecting substantially the orientation of the towers.

I claim:
1. An apparatus for irrigating tracts of land comprising the combination of:
    a radially extending string of distributing conduit pipe,
        a relatively stationary supply connection about which said string is adapted to revolve, said stationary supply connection operatively connected to an irrigating liquid supply source and to said string of pipe for distribution thereby, a central stationary tower and a plurality of movable intermediate towers disposed at different radially spaced apart points along said distributing pipe for supporting and driving said pipe in a circular path around said central tower, a plurality of horizontally extending cable means each tautly attached to each one of said intermediate movable towers and to the adjacent portion of pipe central thereto and extending for a major portion of the distance from one of said movable intermediate towers toward a neighboring movable tower central thereof and there attached to said pipe and fixing the position of said portion of pipe for said major portion of said distance relative to said one of said movable intermediate towers, each said pipe having means firmly fixing said pipe to a movable intermediate tower providing support therefor, the structure of said pipe and the means fixing the pipe to the towers being such that bending of said string of pipe will occur only at points between the said towers, motor means on each of said towers adapted for a continuous speed in accordance with the radial position thereof along said distributing pipe, wheel means on each of said towers, said motor means operatively attached to said wheel means at each of said towers, a power source and energy conductors extending along said distributing pipe, branch conduits connecting said conductors with each of said motors, a connection at said central tower for connecting said conductors with said source of power, said motors automatically proportioning their effective torque to the traction resistance encountered by the tower wheel means whereby a substantially definite ratio of differential speed is automatically maintained between said towers.

2. Apparatus as in claim 1 comprising also a throttle unit at each of said towers between said energy conductors and the motors on each said tower for continuously proportioning to each said motor an amount of power proportional to the distance of said movable tower from said stationary tower.

3. Apparatus as in claim 2 wherein said energy source comprises a motor, a hydraulic pump and a source of hydraulic fluid operatively connected, said energy conductors are hydraulic fluid conduits and are operatively connected to said pump; said motors on said tower stations are hydraulic motors; said throttle unit on each of said towers is a hydraulic valve with an orifice between the branched conductor and said motor on said tower, one portion of said orifice being movable with respect to another, said one portion being a channel opening in a movable valve body and located adjacent another fixed opening at end of a channel in a valve casing fixed to said tower, with the orifice therebetween being smaller than the opening of either of said channels, whereby on forward motion of said upper channel the orifice therebetween is reduced in size and on rearward motion of said upper channnel the orifice therebetween is increased in size and adjustment means locating said one movable orifice portion relative to the second and in advance of the second.

4. Apparatus as in claim 3 comprising also indicator means fixed to the pipe and located at a distance from each tower of said plurality of towers responsive to the bending and twisting of the pipe only radial to said each tower, said throttle unit at each said tower being means for controlling the speed of the driving means at each said tower, and means connecting said indicating means with said throttle unit so as to gradually and smoothly reduce the energy transmitted to the motor means when bending or twisting of the pipe radial to the station takes place in one direction and reducing the energy transmitted to the motor means when said bending or twisting takes place in the opposite direction.

References Cited

UNITED STATES PATENTS

| | | | |
|---|---|---|---|
| 1,068,797 | 7/1913 | Mathers | 239—177 |
| 1,419,925 | 6/1922 | Heine | 239—177 |
| 1,346,843 | 7/1920 | Ramen | 239—177 |
| 2,604,359 | 7/1952 | Zybach | 239—177 |
| 2,893,643 | 7/1959 | Gordon | 239—177 |
| 2,941,727 | 6/1960 | Zybach | 239—177 |
| 3,001,721 | 9/1961 | Zybach | 239—177 |
| 3,353,750 | 11/1967 | Dowd | 239—177 |
| 3,353,751 | 11/1967 | Dowd | 239—177 |
| 3,394,739 | 7/1968 | Bower et al. | 239—212 |

EVERETT W. KIRBY, Primary Examiner

U.S. Cl. X.R.

137—344; 239—212, 213